FOLDING FLATTENED TUBES
Original Filed Dec. 10, 1962 4 Sheets-Sheet 1
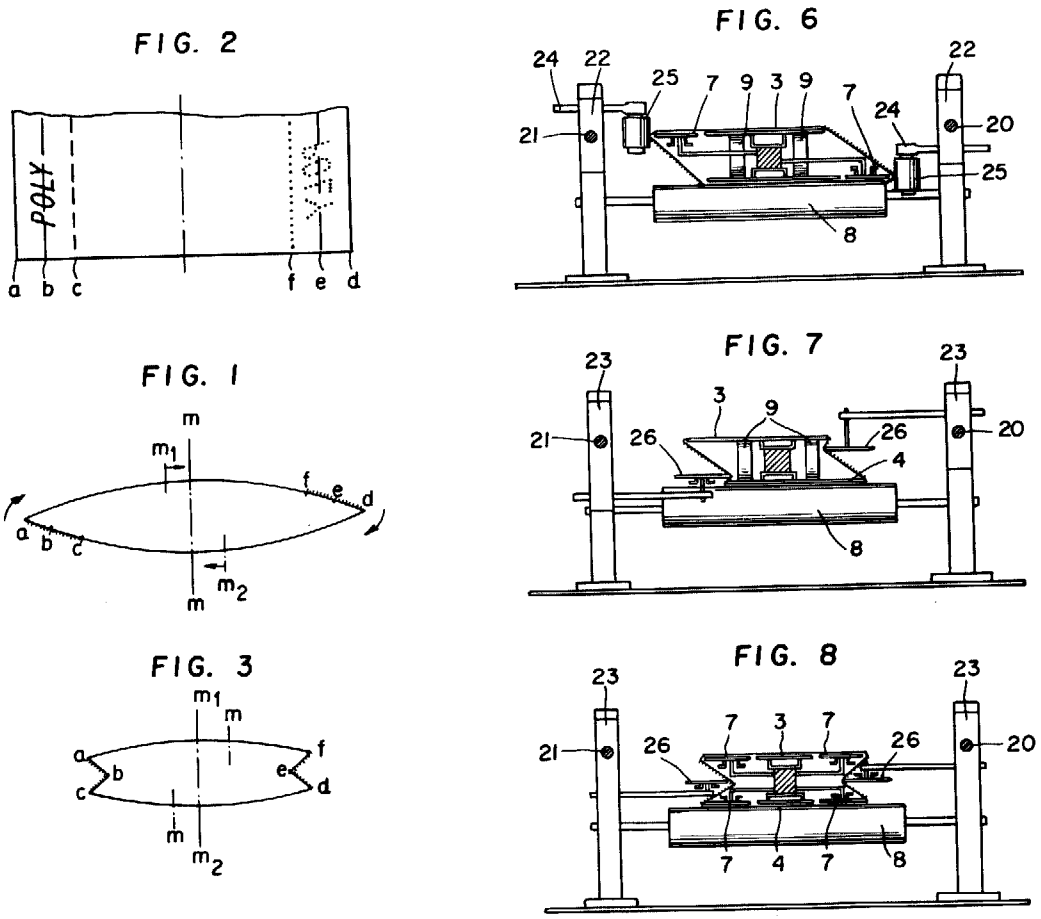
INVENTOR
ANDREAS AHLBRANDT
BY Stevens, Davis, Miller and Mosher
ATTORNEYS

FOLDING FLATTENED TUBES

Original Filed Dec. 10, 1962 4 Sheets-Sheet 2

INVENTOR
ANDREAS AHLBRANDT

BY Stevens, Davis, Miller and Mosher
ATTORNEYS

FOLDING FLATTENED TUBES

Original Filed Dec. 10, 1962 4 Sheets-Sheet 3

INVENTOR
ANDREAS AHLBRANDT

BY Stevens, Davis, Miller and Mosher
ATTORNEYS

FOLDING FLATTENED TUBES

Original Filed Dec. 10, 1962 4 Sheets-Sheet 4

INVENTOR
ANDREAS AHLBRANDT

BY Stevens, Davis, Miller and Mosher
ATTORNEYS

United States Patent Office

Re. 26,062
Reissued July 19, 1966

26,062
FOLDING FLATTENED TUBES

Andreas Ahlbrandt, Lauterbach, Hesse, Germany, assignor to Walter Durbeck Papiersackfabriken G.m.b.H., Lauterbach, Hesse, Germany Original No. 3,185,044, dated May 25, 1965, Ser. No. 243,285, Dec. 10, 1962. Application for reissue Nov. 18, 1965, Ser. No. 512,818
12 Claims. (Cl. 93—20)

Matter enclosed in heavy brackets [ ] appears in the original patent but forms no part of this reissue specification; matter printed in italics indicates the additions made by reissue.

It is known to produce sacks, bags or other objects from sections of endless flat-running tubes or endless doubled webs of paper or plastic material. It is known in this connection, before severing the sections, to fold the endless tubes or webs at one or both longitudinal edges inwardly parallel to the web centre line in such manner that the creased or folded parts subsequently form the lateral or bottom parts of a bag for example, then to flatten the creased tube again before cutting it into the lengths required for the tube sections.

According to the present invention, a method of folding endless flat-running tubes or twin-layered webs along one or both longitudinal edges, for the production of closed containers such as bags, is characterised by the tube or web during the inward folding of the longitudinal creases being turned about its longitudinal axis through half the width of the part to be folded inwards before or within the folding apparatus.

From another aspect according to the present invention an apparatus for carrying out the said method comprises spaced plate-like guide elements over which the tube or web is fed and disposed to open out the flattened tube or web, and plate folding elements disposed between the guide elements to fold the lateral portion or portions of the web along longitudinal crease lines formed thereby, the folding elements being equi-centrally disposed at the exit end of the folding apparatus and being displaced laterally relative to each other, by the width of the part of the tube or web which is to be folded inwards, at the part of the apparatus where the opened out tube or web enters the folding apparatus.

One advantage of the invention is that the fold lines present in the flat-running tube or web can be retained with the given direction of folding. Without the turn of the web performed by the invention, these would have to be folded in opposite direction. Another advantage is that complete and simply applied impression of printed matter becomes possible on the tube or web inclusive of the folded areas. This operation was not hitherto possible to perform in the case of flat-running tubes, since the half of the tube part forming the creases lay at the top and the other half at the bottom, i.e. crease lines or longitudinal edges of the flat-running tube coincided with the middle of the folded areas. The original crease lines of the tube or web may now be retained and allowed to coincide with a corresponding one of the crease lines to be freshly formed, so that the tube half positioned at the top may for example form the anterior part and a lateral part of a bag, and that the half positioned at the bottom may form the rear part and a lateral part of a bag or vice versa. The lateral parts of a bag may now receive printed matter without difficulty. What is attained by the turning of the tube about its longitudinal axis which is assumed to be spatially fixed, by half the width of a folded part, and which may be undertaken before or during the inward folding of the lateral parts is, that the tube is folded in the same manner as when its fold lines form the middles of the folded parts. This ensures, that the middle lines of the tube parts forming the back and front of a bag are brought into congruence. No more folding positions are needed to this end moreover, than was the case hitherto. Only such folding positions as are absolutely necessary are added to the folded positions already present.

In order that the invention may be more fully understood some embodiments in accordance therewith will now be described by way of example with reference to the accompanying drawings in which:

FIGURES 1 to 3 show diagrammatically a flat-running tube in section and plan view respectively;

FIGURES 6 to 8 show diagrammatically cross sections through FIGURE 4 along the lines VI—VI, VII—VII and VIII—VIII respectively looking in the direction of the arrows;

Figure 4:
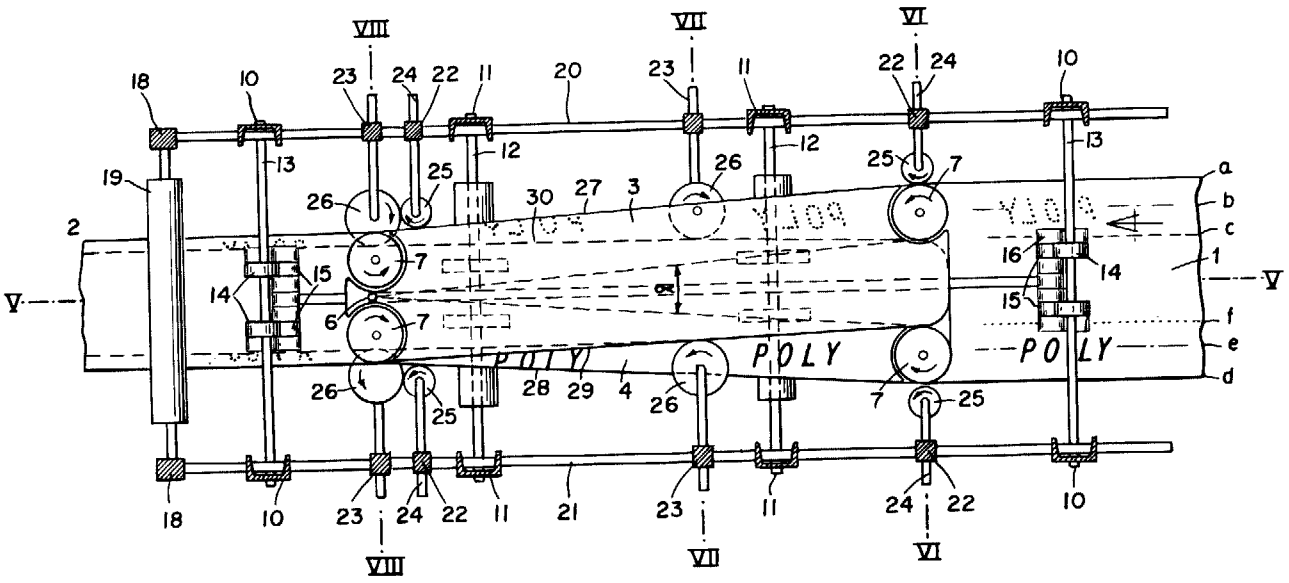
FIGURE 4 shows a plan view of a tube or web folding mechanism.

FIGURE 1 shows a cross section through an endless closed tube 1, preferably made of a thermoplastic synthetic material, which is intended for the production of bags. The tube is folded together flat, along the two fold lines a and d. As apparent from the plan view of the tube in FIGURE 2, the tube carries printed text matter, only the text matter present on the parts to be folded, i.e. the subsequent lateral parts of the bag, being shown. The part extending between the fold line a namely the edge of the flat-running tube and the line c forms the one lateral part, and the part extending between the fold line d and the line f forms the other lateral part of the subsequent bag, the part extending between the fold line a and the line f forming the back part, and the part extending between the line c and the fold line d forming the front of the bag. As apparent from FIGURE 2, the upper and lower halves of the flat-running tube may receive the impression of printed text matter at the same time as the back and front of the bag.

FIGURE 3 shows a cross section through the tube 2 folded by means of the invention. As apparent, the tube part a–f now forms the top side of the tube, and the tube part c–d the bottom side of the tube. The parts a–c and d–f corresponding to the lateral parts of the bag are now folded inwards. The lines b, c, e and f now form fold lines. As apparent from a comparison between FIGURES 1 and 3, the fold line a has travelled towards the right-hand side by the distance of the width (a–b), and the fold line also towards the right-hand side by the same distance. The fold line d has travelled towards the left-hand side by said half width, as has the fold line c. The fold line e has travelled towards the left-hand side and the fold line b towards the right-hand side. Altogether, the tube has been turned by half the width of a lateral part about the axis m—m assumed to be spatially fixed. The middle lines of the parts d–c and a–f marked m1 and m2 in FIGURE 1 have now been brought into superposition, so that these middle lines now coincide with the axis m—m.

The tube shown in FIGURE 3 can be pressed flat again and subsequently be cut up into lengths corresponding to the tube sections. The aforesaid turning of the tube assures that the printed parts a–c and d–f assume the position which must be occupied by the lateral parts of the bag, and that the original fold lines a and d of the tube form identical fold lines again.

Two apparatus are hereinafter described by way of example, by means of which the turning of the tube explained heretofore may be performed about a spatially fixed central axis.

The apparatus shown in FIGURES 4 to 8 comprises two identically constructed guide plates 3 and 4 disposed and fastened to either side of a bearer 5 in such manner that, as seen in the direction of travel of the tube namely at the trailing extremity of the tube, the two plates 3, 4 are disposed in equi-central coincidence. The plates are attached to the bearer body 5 preferably by means of a peg 6 as shown or the like, in such manner that the plates 3 and 4 may be displaced relative to each other by pivoting about the peg 6.

The width of the plates corresponds to the spacing of the lines a–f and c–d in FIGURE 1. The plates are so displaced relative to each other, that at the leading side for the tube 1, the distance between the inner edge of each plate and the adjacent outer edge of the other plate corresponds to the width of the parts a–c and d–f to be folded.

Figure 5:
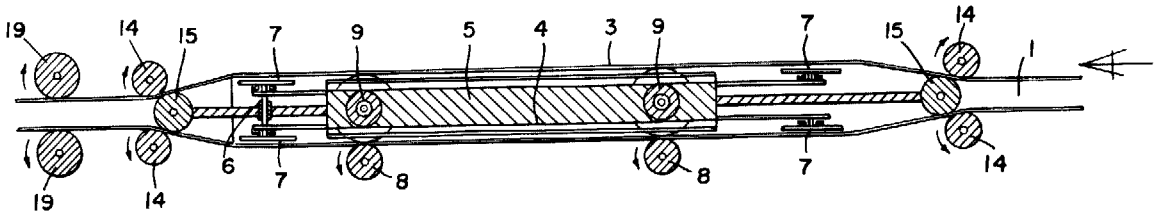
FIGURE 5 shows a longitudinal cross section through the folding mechanism along the line V—V in FIGURE 4 looking in the direction of the arrows.

The three externally positioned corners of each guide plate 3, 4 are formed as rotary discs 7 or the like in order to reduce friction. Discs mounted in rotary manner only may be employed instead of the plates. As shown in FIGURE 5, the plates 3 and 4, as well as the bearer or bearing slab 5 and the discs 7, are disposed within the tube 1. Their weight is borne by rollers 8 which are rotatably mounted in the frame of the apparatus. These rollers operate in conjunction with rollers 9 which are rotatably mounted on the bearer 5, i.e. the lower half of the tube 1 runs between the rollers 8 and 9.

The frame of the apparatus is shown diagrammatically as channel sections 10 and 11. The spindles 12 of the rollers 8 are mounted in the channel section 11, and pairs of spindles 13 having rollers 14 between which the tube is pulled through, are mounted in the channel section 10. Rollers 15 are mounting pivots 16 of which are secured to the back and front extremities of the bearer 5 through arms 17, bear against the rollers 14. The rollers 15 receive the thrust exerted by the tube on the guide plates 3 and 4. On the take-off side for the tube 2, the spindles of a pair of rollers 19 acting to press smooth the folded tube 2 are secured in the frame uprights 18. The longitudinal cheek plates 20 and 21 extending parallel to the central axis of the apparatus and diagrammatically shown as rods, are secured in the channel sections 10, 11. Displaceable thereon are bearers 22 and 23 disposed in pairs and within the latter are displaceable rods 24 on the extremities of which are mounted either guide rollers 25 or folding discs 26. These rollers or discs are provided in greater number than shown in the drawings.

As apparent from FIGURES 6 to 8, the edges marked a and d travel along the externally disposed edges 27 and 28 of the guide plates 3 and 4, and the latter fold lines c and f along the internally disposed edges 30 and 27 of said plates respectively. The folding points d and e are formed by means of the discs 26, the turning of the tube explained with reference to FIGURES 1 to 3 thus occurring about the axis m—m.

Figure 10:
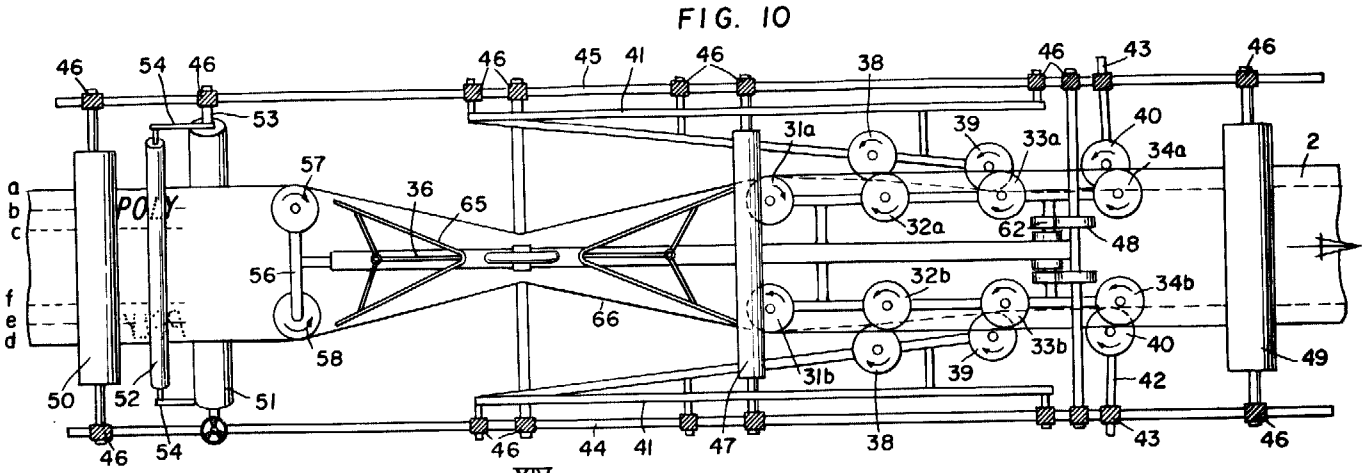
FIGURES 9, 10 and 11 show in longitudinal cross section, plan view and end view respectively, another folding mechanism.
Figure 9:
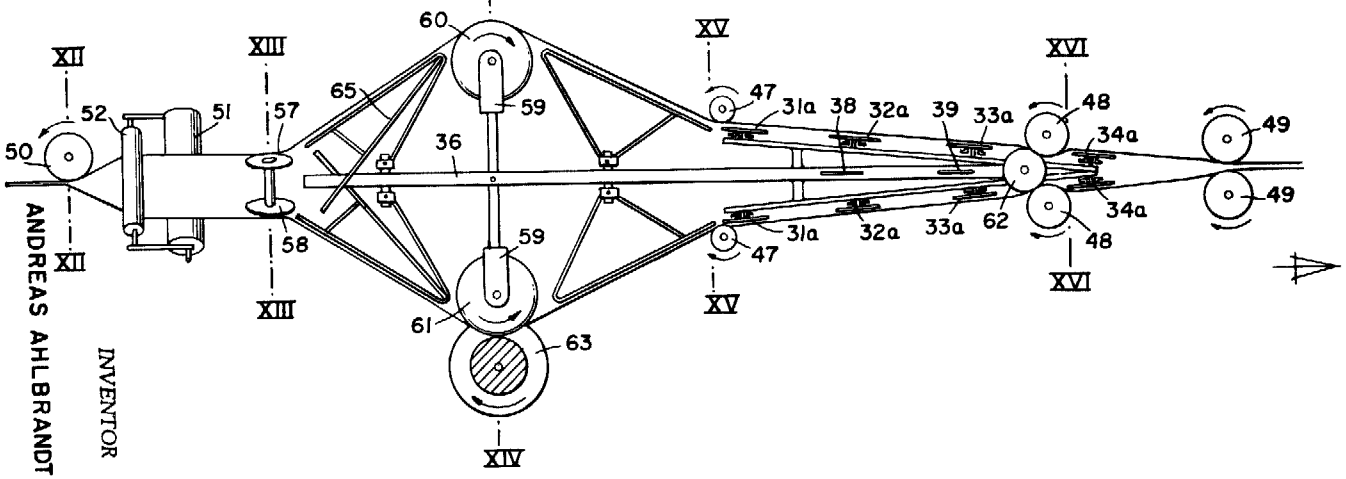

The direction of travel of the fold edges a and d varies in the apparatus described when the tube runs on to the plates. In the case of material of low elasticity, this could lead to crease formation. This is largely avoided in the apparatus shown in FIGURES 9 to 16, wherein an essentially known folding device shown on the right-hand half of FIGURES 9 and 10 is employed with an auxiliary device in accordance with the invention in order to fold the tube.

Figure 16:
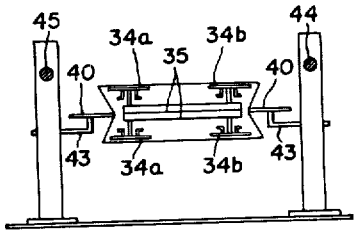
Figure 14:
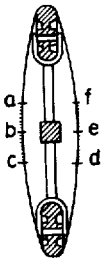

The folding mechanism, the middle plane of which is assumed to lie horizontally in the drawings, comprises eight pairs of discs 31a to 34a and 31b to 34b respectively, disposed consecutively along the direction of travel of the tube and on either side of the axis of the tube with the spacing of the width of the parts of the tube which are not to be folded. The spacing between the first pair of discs 31a and 31b, as shown in FIGURE 14, corresponds to the width of the parts of the tube which are to be folded. The spacing between the pairs of discs 32a to 34a decreases according to the progressive folding of the lateral parts, as shown in FIGURE 16. The discs 31a to 33a and 31b to 33b are rotatably mounted in plates 35 secured on a bearer 36, and the discs 34a and 34b separately on a different plate which may also be secured to the bearer 36.

The pairs of folding discs marked 38, 39 and 40 are used for the folding operation. The discs 38 and 39 are fitted to frames or brackets 41 which are pivotably hinge-mounted on the frame of the apparatus, so that the depth of penetration of the discs is adjustable, and the folding discs 40 are mounted on rods 42 which are displaceable in bearers 43. These are located on the longitudinal cheek plates 44 and 45 of the frame, which are fastened in the frame uprights 46. Three of these pairs of uprights 46 are used to mount the pairs of rollers 47, 48 and 49 to guide the tube. The pair of rollers 49 at the same time collapse the folded tube 2.

At the entry side of the apparatus, the tube 1 is guided by a roller 50 which is also rotatably mounted in the frame upright 42. It is moreover assumed to be horizontal in the drawings, or it may alternately extend at an angle to the median plane of the folding apparauts. A pair of rollers 51, 52 follows the roller 50 in the direction of travel. The roller 51 is rotatably mounted on a spindle 53 which is secured in the upright 46 of the frame so as to swivel about the middle line m—m of the tube. The roller 52 is rotatably mounted in arms 54 which are secured on the spindle 53. The tube runs beneath the roller 52 and above the roller 51. The spindle 53 of the roller 51 is turned through an angle relative to the horizontal, i.e. to the central plane of the folding apparauts. This angle is adjustable, preferably by means of a worm drive, i.e. the spindle 50 is located in bearers sliding in the uprights 46 and can be adjusted by the worm drive.

Figure 11:
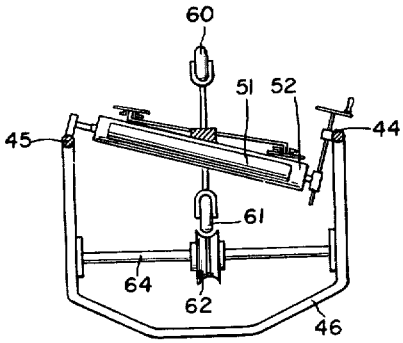

The oblique disposition of the pair of rollers 51, 52 is apparent from FIGURE 11 which also shows the mobility of the spindle 53 relative to the frame of the apparatus.

Figure 13:
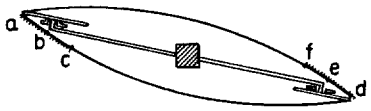

The rod-shaped bearer 36 located in the middle axis of the tube carries an arm 56, at its rear extremity, on which two discs 57 and 58 are rotatably mounted. The arm 56 can swivel relative to the bearer 36 and is set to the same angle as the pair of rollers 51, 62. The spacing between the outer disc edges approximately corresponds to tube width, as shown in FIGURE 13.

Forks 59 each comprising a roller 60 and 61 respectively, are secured to the bearer 36 approximately midway between the rollers 57, 58 and the rollers 47 appearing at right angles to the bearer 36 in the drawing. Mounted at the rear extremity of the bearer 36 there are rollers 62 bearing on the rollers 48 and receiving the thrust exerted by the tube on the bearer 36. The rollers 61 bear on a roller 63 rotatably mounted on a spindle 64 which is secured in the frame uprights 46 (FIGURE 11).

A spreader device 65 made of bent wires is secured close to the arm 56 on the bearer 36, and a similar spreader device 66 is secured between the rollers 60 and 61 respectively and the folding mechanism.

The manner of operation of the apparauts is hereinafter described with reference to FIGURES 12 to 16.

Figure 12:
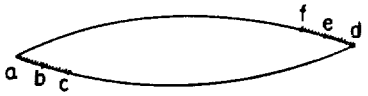
FIGURES 12 to 16 show diagrammatically cross sections through FIGURE 9 along the lines XII—XII to XV—XV respectively looking in the direction of the arrows.

FIGURE 12 shows the position of the tube in section, as determined by the roller 50, the middle plane of the tube coinciding with the middle plane of the folding mechanism. Tre lines a to f are also shown on FIGURE 12. The tube again carries printed text matter, as already described with reference to FIGURES 1 to 3. FIGURE 13 shows the middle plane of the tube turned through the angle $\alpha$. This position of the lines a to f relative to the axis m—m of the tube has remained unchanged. The turning of the plane of the tube is caused by the oblique position of the pair of rollers 51, 52. The inclination of the pair of rollers relative to the middle plane of the folding apparatus is so adjusted, that the tube is turned through half the width of a lateral part, the tube then being directly drawn on to the folding mechanism. This operation can be facilitated however, by first drawing the tube out of the oblique position into a plane forming an angle of 90° or approximately 90° with the middle plane of the folding apparatus. This is carried out by means of the pair of rollers 60, 61 causing a displacement of the plane of the tube through 90° as shown in FIGURE 14 and simultaneously a turning of the tube about its middle axis through half the width of the part which is to be folded. The displacement of the plane of the tube offers the advantage moreover, that a fixed given position of the plane of the tube is established relative to the plane of the folding apparatus, which facilitates adherence to a definite amount of turn with the aid of the rollers 51, 52.

Figure 15:
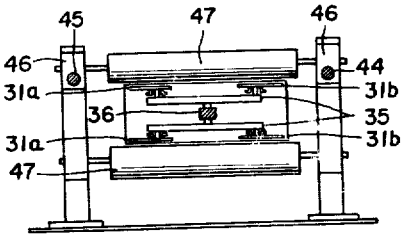

FIGURE 15 shows in cross section the manner in which the tube 5 runs on to the folding apparatus. It is apparent, that the tube has been turned through half the width of a lateral part. The original lateral edges a and d are now diagonally displaced relative to each other and still each form a lateral edge of the tube. Starting from this position of the tube, the laying into folds is initiated, i.e. the inward folding of the lateral parts.

FIGURE 16 shows the cross section of the tube towards the end of the fold laying operation. The printed text matter originally appearing on the back and front of the flattened tube between the lines a–b and d–f now appears wholly in the lateral fold and thus on the lateral parts of the subsequently formed bag. c and f are newly formed lateral edges of the tube, and b and e newly formed inner edges of the folded tube.

It would essentially be possible to allow the tube wound on a draw off roll to run directly off its roll to the folding apparatus, or initially to the rollers 60, 61. The axis of the roll would then have to be inclined correspondingly. The interposition of the roller 50 eliminates the disadvantages however which are connected with the diminishing diameter of the draw off roll.

The folding of two-layered webs is carried out on the first described apparatus, the web being held fast in known manner by means of rubber rollers. The invention is thus also applicable to the folding of only one longitudinal edge of the web. This is advantageously applied in the case in which the longitudinal folds are to form the bottom portion of an open bag.

In order to use the folding apparatus shown in FIGURES 4 and 5 for tubes of different widths, the guide plates are advantageously made in split form, so that their width may be varied by displacement of their parts relative to each other. If guide discs are employed instead of guide plates the distance between the guide discs pertaining to one guide plate is made adjustable for the same purpose. The swivelling mounting of the guide discs about the swivel pin 6 renders it possible to vary the angle between the middle lines of the guide discs and the middle line of the apparatus.

I claim:

1. A method of [folding continuously moving] *transforming* flat tube-like webs [to produce] *in the production of* package bags of artificial material [with the bag in a filled state being approximately rectangular in cross section], comprising continuously moving the web *which is characterized by a longitudinally extending marginal portion thereof bearing indicia,* [longitudinally] and rotating the web around its *longitudinal* axis [as to the movement of the web] a distance which is equivalent to one half the width of [two opposite sides] *the marginal portion* of the [rectangular configuration of the bag] *web.*

2. A method according to claim 1, in which the step is included of forming [a center crease line along the middle of each said opposite sides of the rectangular configuration and forming an] inwardly directed accordion pleats in [said] opposite sides *of the web during its transformation.*

[3. An apparatus for folding endless flat running tube-like webs along at least one edge for producing bag-like closed containers comprising guide elements spaced in the form of circular plates over which the web is fed, means to open out the flattened web and turn the web about its longitudinal axis half the width of the lateral web portion, and folding elements in the form of circular plates mounted between the guide elements to fold each lateral web portion inwardly along longitudinal crease lines formed in the web, the folding elements being equi-centrally disposed at an exit end displaced laterally of each other by the width of the part of the tubular web to be followed.]

[4. An apparatus according to claim 3, in which a bearing slab is provided with the guide elements within the web supported on rollers which are mounted on the bearing slab and in which rollers are provided carrying the weight of the folding elements on said supporting rollers and are rotatably mounted on the bearing slab.]

[5. An apparatus according to claim 3, in which pairs of rollers are provided disposed at the leading and trailing ends of the said elements so that the web runs flat between the rollers of said pairs and in which a bearing slab and rollers are provided so that said elements will bear against the rollers of each of said pairs.]

[6. An apparatus for folding endless flat running tube-like webs along at least one edge for producing bag-like closed containers comprising guide elements in the form of circular spaced plates over which the web is fed, and means to open out the flattened web and turn the web about its longitudinal axis half the width of the lateral web portions, and folding elements in the form of plates mounted between the guide elements to fold each lateral web portion inwardly along longitudinal crease lines formed in the web, the folding elements being equi-centrally disposed at the exit end displaced laterally of each other by the width of the part of the tubular web to be folded, the spacing of the guide elements within the tubular web being measured at right angles to the middle plane of the web, and the spacing between the folding elements as in the middle plane of the web gradually diminishing, and a guide mechanism for the web to turn the plane of the web relative to the middle plane of the folding elements.]

[7. An apparatus according to claim 6, in which said angular setting of the guide mechanism relative to the middle plane of the folding elements is adjustable.]

[8. An apparatus according to claim 6, wherein a pair of rollers are provided so that the web passes between the pair of rollers.]

[9. An apparatus according to claim 6, in which the guide mechanism comprises rotatably mounted discs mounted within the tubular web.]

[10. An apparatus according to claim 6, in which a spreader device is provided for the web and by which the plane of the web may be turned through approximately 90° relative to the middle plane of the folding mechanism, said spreader device being mounted between the guide mechanism and the folding mechanism.]

[11. An apparatus according to claim 6, in which a spreader device is provided for the web and by which the plane of the web may be turned through approximately 90° relative to the middle plane of the folding mechanism, said spreader device being mounted between the guide mechanism and the folding mechanism, the spreader device comprising two rollers supported on members secured to a bearer disposed within the tubular web.]

*12. A method of transforming a continuously moving flattened tube of artificial material which tube is characterized be bearing indicia along at least one marginal out-*

*er surface region lying adjacent to and on one side of an original fold line comprising the steps of spreading the tube to open same, thereafter reflattening the opened tube along new fold lines parallel to but rotatively displaced from the original fold lines, one of said new fold lines lying midway of the marginal outer surface region and another lying diametrically opposed thereto, so that the indicia will lie in marginal surface areas adjacent to but on opposite sides of said one new fold line.*

*13. A method according to claim 12 in which is included the further step of forming inwardly directed accordion pleats in opposite sides of the tube symmetrically to the new fold lines during its transformation.*

*14. A method of transforming a continuously moving flattened tube of artificial material which tube is characterized by bearing indicia along at least one marginal outer surface region lying adjacent to and on one side of an original fold line comprising the steps of mechanically spreading the tube to open same, thereafter engaging the opened tube from within along new fold lines parallel to but rotatively displaced from the original fold lines, one of said new fold lines lying midway of the marginal outer surface region and another lying diametrically opposed thereto, and reflattening the tube along the new fold lines so that the indicia will lie in marginal surface areas adjacent to but on opposite sides of said one new fold line.*

*15. An apparatus for folding continuously moving flat tube-like webs having a longitudinally extending marginal portion bearing indicia and intended to be used to produce package bags comprising means for continuously moving the web longitudinally and means for rotating the web around its longitudinal axis a distance which is equivalent to one half the width of the marginal portion of the web.*

*16. An apparatus according to claim 15 wherein said means for rotating the web includes means for spreading the web to open same and means for refolding the web along fold lines rotatively displaced from the original fold lines.*

*17. An apparatus for folding a flat running tube-like web having indicia on a marginal portion thereof comprising means for spreading open a flattened tube-like web, means for engaging the spread web from within along diametrically opposed lines rotatively displaced from the original fold lines of the web by a distance equal to one half the width of the marginal portion thereof having indicia, and means for reflattening the web along said diametrically opposed lines.*

*18. An apparatus for working a flattened tube having indicia along at least one marginal outer surface region lying adjacent to and on one side of an original fold line comprising means for mechanically spreading the flattened tube to open same, means for engaging the opened tube from within along new fold lines parallel to but rotatively displaced from original fold lines, one of said new fold lines lying midway of the marginal outer surface region and another lying diametrically opposed thereto, and means for reflattening the tube along the new fold lines so that the indicia will lie in marginal surface areas adjacent to but on opposite sides of said one new fold line.*

*19. An apparatus for folding a flat running tube-like web having indicia on a marginal portion thereof comprising internal structural means including elongated first and second guide means adapted to be oriented in the direction of travel of the web and means supporting said guide means spaced apart in a direction perpendicular to the intended plane of travel of the web, in spatial registry at their outrunning ends, and in spatial lateral displacement at their on-running ends, said web intended to be fed over said internal structural means and opened out thereby, means to support and retain the position of the internal structural means when a web is fed over same, means adapted to act on the lateral portions of said web as is passes over the internal structural means to initiate inwardly directed folds in the middle of the marginal portion having indicia and the marginal portion diametrically opposed thereto, and means adapted to reflatten the web in producing symmetrical accordion pleats on opposite sides thereof which include said inwardly directed folds.*

*20. An apparatus for folding a flat running tube-like web having indicia on a marginal portion thereof comprising internal spreader means onto and over which the web runs to open same, said spreader means composed of a frame and a pair of spaced rollers to engage the inner surface of the web along diametrically opposed lines lying in a plane oblique to the on-running plane of the web, and a folding mechanism to refold the spread tube along lines lying in a plane angularly displaced from the plane of engagement of the rollers so that the out-running refolded web will have the indicia lying adjacent to a new fold line on opposite sides thereof.*

*21. An apparatus according to claim 20 wherein the folding mechanism acts to refold the spread tube along lines lying in a plane 90 degrees displaced from the plane of engagement of the rollers.*

References Cited by the Examiner

The following references, cited by the Examiner, are of record in the patented file of this patent or the original patent.

UNITED STATES PATENTS

| | | | |
|---|---|---|---|
| 2,701,989 | 2/1955 | Hayward et al. | 93—20 |
| 2,961,930 | 12/1960 | Wamsley et al. | 93—1 |
| 3,059,548 | 10/1962 | Kaplan et al. | 92—20 |

BERNARD STICKNEY, *Primary Examiner.*